US008648631B2

(12) United States Patent (10) Patent No.: US 8,648,631 B2
Latal et al. (45) Date of Patent: Feb. 11, 2014

(54) DETECTOR CIRCUIT AND METHOD

(75) Inventors: Pavel Latal, Roznov P. R. (CZ); Petr Papica, Frenstat pod Radhostem (CZ); Radim Mlcousek, Frenstat pod Radhostem (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/194,455

(22) Filed: Jul. 29, 2011

(65) Prior Publication Data

US 2013/0027087 A1 Jan. 31, 2013

(51) Int. Cl.
*H03L 7/00* (2006.01)

(52) U.S. Cl.
USPC ........................................................ 327/142

(58) Field of Classification Search
None
See application file for complete search history.

(56) References Cited

U.S. PATENT DOCUMENTS

| | | | | |
|---|---|---|---|---|
| 4,193,478 | A * | 3/1980 | Keller et al. | 187/247 |
| 5,272,394 | A * | 12/1993 | Kirk et al. | 327/58 |
| 5,302,863 | A * | 4/1994 | Walley et al. | 327/60 |
| 7,616,460 | B2 * | 11/2009 | Huang | 363/55 |
| 7,839,182 | B2 * | 11/2010 | Malherbe et al. | 327/58 |
| 2008/0246459 | A1 | 10/2008 | Ingman | |
| 2009/0290385 | A1 | 11/2009 | Jungreis et al. | |
| 2010/0309694 | A1 | 12/2010 | Huang et al. | |
| 2011/0025278 | A1 | 2/2011 | Balakrishnan et al. | |

OTHER PUBLICATIONS

Reference Design Report for Active Discharging of the X Capacitor for reduced No-load Power Consumption Using CAP Zero CAP014DG, by the Applications Engineering Department, Document No. RDR-252, Apr. 10, 2010, Revision 1.0, www.powerint.com.
Application Note AN-48 CAPZERO-Family, Design Considerations, Power Integrations, Rev. C 09/10, www.powerint.com.
216 W All in One Power Supply Reference Design Featuring NCP1605, NCP1397, NCP4303 Documentation, by ON Semiconductor, TND399/D, Rev. 0, Feb. 2010, p. 1-25, www.onsemi.com.

* cited by examiner

*Primary Examiner* — Daniel Rojas
(74) *Attorney, Agent, or Firm* — Rennie William Dover (57) ABSTRACT

In accordance with an embodiment, a controller includes a comparator, a delay element, and a timer. The delay element is connected to an input terminal of the comparator and the timer is connected to an output terminal of the comparator. The delay element may include a switch having a control electrode coupled for receiving a control signal. In accordance with another embodiment, a detection signal is generated in response to a comparison signal transitioning to a first level.

21 Claims, 4 Drawing Sheets

DETECTOR CIRCUIT AND METHOD

BACKGROUND

The present invention relates, in general, to electronics and, more particularly, to methods of forming semiconductor devices and structure.

In the past, the electronics industry used switching mode power supplies to provide regulated power to electronic devices used in communications systems, aviation systems, telecommunications systems, consumer electronics, etc. A technique for providing regulated power is described in U.S. Patent Application Publication No. 2008/0246459 filed by Thomas M. Ingman and published on Oct. 9, 2008. An area of concern in these applications is power consumption in the switching mode power supplies. Techniques for lowering power consumption have been described in U.S. Patent Application Publication No. 2010/0309694 A1 filed by Wei-Hsuan Huang et al. and in Application Note AN-48, Rev. C, titled "CAPZero-Family Design Considerations," published by Power Integrations in September 2010. Although the techniques included in these disclosures may lower the power consumption, they may not be suitable for meeting the discharge requirements of the X capacitors such as those specified in, for example, the IEC 60950 Safety guidelines for information technology equipment. In addition, they may use additional components that are large and expensive to implement and they may be lossy.

Accordingly, it would be advantageous to have a method and structure for determining whether an AC signal is coupled to a power supply. In addition, it is desirable for the method and structure to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. In addition, a current carrying electrode may mean a terminal or contact of a switch and a control electrode may mean an element of the switch that controls closing and opening the switch or connecting or disconnecting the terminals or contacts from each other. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Figure 1:
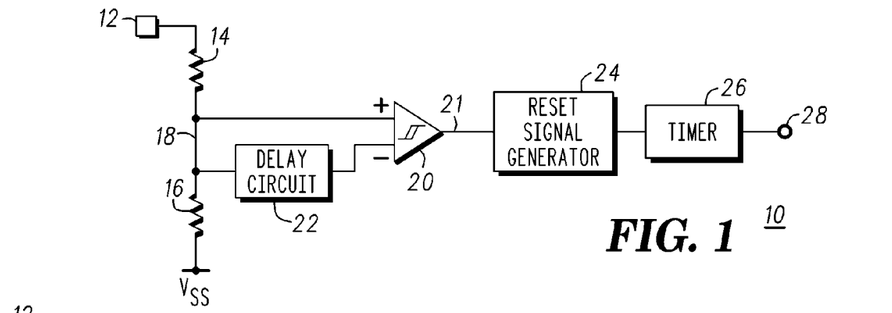
FIG. 1 is a circuit schematic of a portion of a controller in accordance with an embodiment of the present invention.

FIG. 1 is a circuit schematic of a controller 10 in accordance with an embodiment of the present invention. Controller 10 is comprised of resistors 14 and 16, a comparator 20, a delay circuit 22, a reset signal generator 24, and a timer 26. More particularly, resistor 14 has a terminal connected to an input terminal 12, resistor 16 has a terminal coupled for receiving a source of operating potential $V_{SS}$, and resistors 14 and 16 have terminals that are commonly connected together to form a node 18. It should be noted that input terminal 12 may be an input pin. Resistors 14 and 16 form a voltage scaling network. Comparator 20 has a noninverting input terminal connected to node 18, an inverting input terminal connected to node 18 through delay circuit 22, and an output terminal 21 connected to an input terminal of reset signal generator 24. By way of example, comparator 20 has hysteresis and source of operating potential $V_{SS}$ is a ground potential. Timer 26 has an input terminal connected to an output terminal of reset signal generator 24 and an output terminal which serves as output terminal 28 of controller 10. It should be noted that the input terminal of timer 26 is a reset terminal and that a logic high voltage level at the reset terminal serves as a reset signal that resets detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

Figure 2:
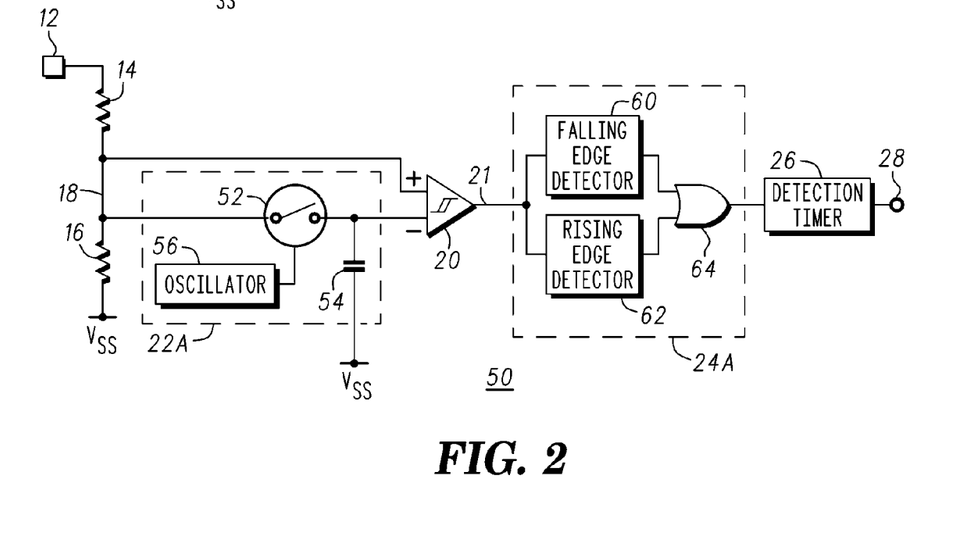
FIG. 2 is a circuit schematic of a portion of a controller in accordance with another embodiment of the present invention.

FIG. 2 is a circuit schematic of a controller 50 in accordance with another embodiment of the present invention. Like controller 10, controller 50 includes resistors 14 and 16, comparator 20, timer 26, a delay circuit, and a reset signal generator. Because the delay circuit and the reset signal generator may have different architectures or configurations from delay circuit 22 and reset signal generator 24, they are identified by reference characters 22A and 24A, respectively. By way of example, delay circuit 22A may be comprised of a switch 52 connected between node 18 and the inverting input terminal of comparator 20 and an energy storage element 54 connected between the inverting input terminal of comparator 20 and source of operating potential $V_{SS}$. More particularly, switch 52 has a control electrode, a current carrying electrode connected to node 18, and a current carrying electrode commonly connected to the inverting input terminal of comparator 20 and a terminal of energy storage element 54. Delay element 22A further includes an oscillator 56 having an output terminal connected to the control electrode of switch 52. Energy storage element 54 may be a circuit element capable of storing an analog voltage, an analog current, or charge. By way of example, energy storage element 54 is a capacitor, oscillator 56 is a low frequency oscillator, and switch 52 is a transistor. The type of transistor comprising switch 52 is not a limitation of the present invention, e.g., transistor 52 may be a field effect transistor, a bipolar junction transistor, or the like. Alternatively, switch 52 may be a relay.

In accordance with an embodiment of the present invention, reset signal generator 24A may be comprised of a falling edge detector 60, a rising edge detector 62, and a logic gate 64. For example, falling edge detector 60 and rising edge detector 62 each have an input terminal commonly connected to each other to form a terminal that serves as the input terminal of reset signal generator 24A, wherein the commonly connected input terminals are connected to output terminal 21 of comparator 20. An output terminal of falling edge detector 60 is connected to an input terminal of logic gate 64 and an output terminal of rising edge detector 62 is connected to another input terminal of logic gate 64. An output terminal of logic gate 64 serves as an output terminal of reset signal generator 24A and is connected to the input terminal of detection timer 26.

Figure 3:
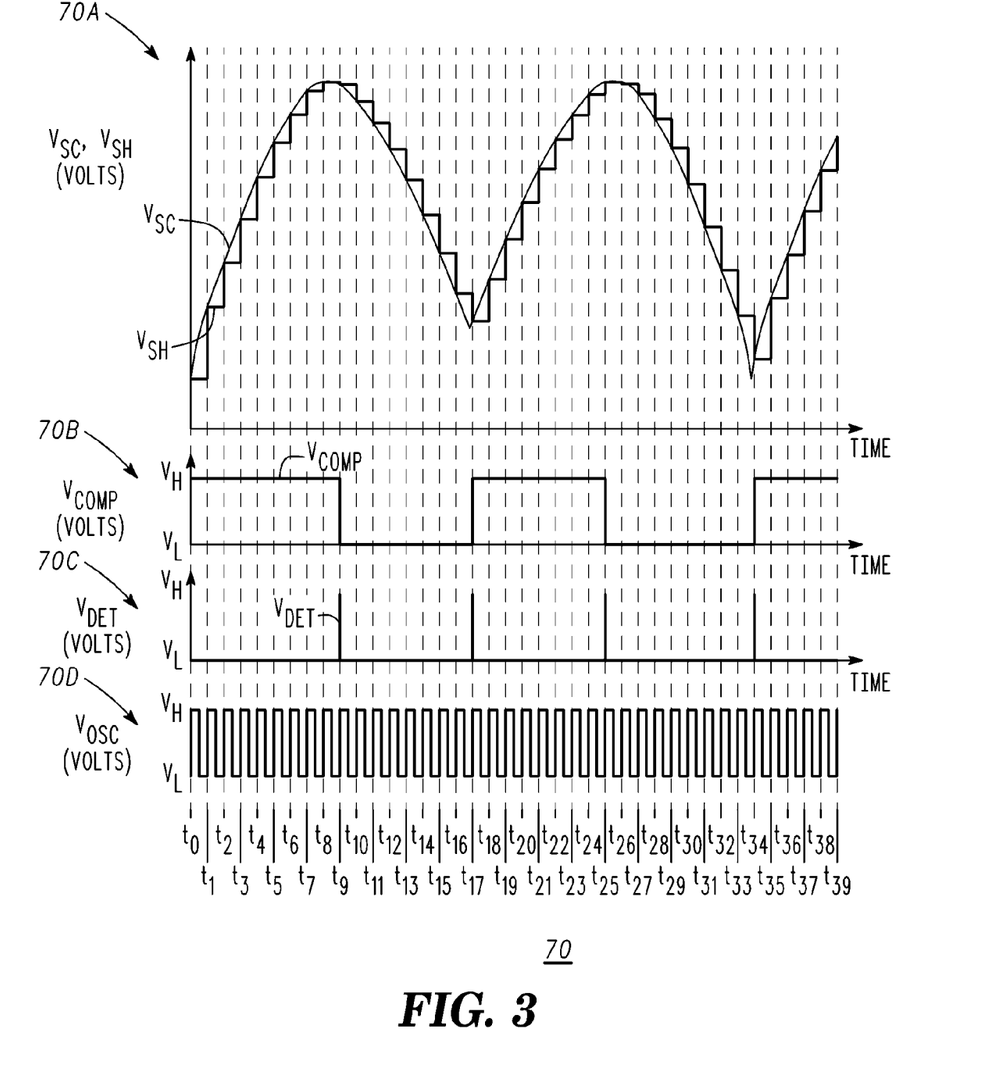
FIG. 3 is a timing diagram for the portion of the controller of FIG. 2 in accordance with an embodiment of the present invention.

In operation, controller 50 detects the occurrence of a rising edge or a falling edge of an AC signal appearing at input terminal 12 and transmits a scaled representation of the AC signal to the noninverting input terminal of comparator 20. In response to the rising edge or the falling edge, controller 50 determines whether an AC signal is coupled to input terminal 12. FIG. 3 is a timing diagram 70 that illustrates the operation of controller 50 in accordance with an embodiment of the present invention. Timing diagram 70 includes voltage plots 70A, 70B, 70C, and 70D. Plot 70A includes graphs of signals $V_{SC}$ and $V_{SH}$ that appear at the noninverting and inverting input terminals of comparator 20, respectively, versus time. Signal $V_{SC}$ is the scaled representation of the AC signal that appears at input pin 12 and signal $V_{SH}$ is a sampled signal of the scaled signal $V_{SC}$. It should be noted that signal $V_{SH}$ is a delayed signal, thus at a point in time, e.g., time $t_1$, the value of signal $V_{SH}$ at the inverting input terminal is different from the value of signal $V_{SC}$ at the noninverting input terminal because it was sampled at an earlier time than the current value of signal $V_{SC}$ appearing at the noninverting input terminal. Plot 70B is a graph of an output signal $V_{COMP}$ of comparator 20 versus time, plot 70C is a graph of an output signal $V_{DET}$ of detection timer 26 versus time, and plot 70D is a graph of an output signal $V_{OSC}$ from oscillator 56. By way of example, signals $V_{SC}$, $V_{SH}$, $V_{COMP}$, and $V_{DET}$ are voltage signals. Output signal $V_{DET}$ may be referred to as a detection signal and output signal $V_{OSC}$ may be referred to as a clock signal or a control signal because it serves as a control signal for switch 52.

Still referring to FIG. 3, before time $t_0$, scaled and sampled signal $V_{SH}$ shown in plot 70A appears at the inverting input terminal of comparator 20. As discussed above, signal $V_{SH}$ is a scaled and sampled representation of the AC signal appearing at input terminal 12. Scaled and sampled signal $V_{SH}$ is substantially equal to the sum of the voltage across capacitor 54 and the voltage of operating potential $V_{SS}$ and may be referred to as a stored or sampled voltage. Before time $t_0$, scaled voltage signal $V_{SC}$ appears at the noninverting input terminal of comparator 20. Comparator 20 compares scaled voltage signal $V_{SC}$ appearing at its noninverting input terminal with scaled and sampled signal $V_{SH}$ appearing at its inverting input terminal and generates an output signal $V_{COMP}$ at terminal 21 in response to the comparison. In the example shown in FIG. 3, voltage $V_{SC}$ at the noninverting input terminal is greater than voltage $V_{SH}$ at the inverting input terminal, thus comparison voltage $V_{COMP}$ generated by comparator 20 is at a logic high voltage level $V_H$.

From a time before time $t_0$ to at least time $t_8$, the scaled voltage signal $V_{SC}$ appearing at node 18 and at the noninverting input terminal of comparator 20 is a rising or increasing signal and at time $t_0$ scaled and sampled voltage signal $V_{SH}$ appearing at the inverting input terminal of comparator 20 is derived from a sampled signal that occurred before time $t_0$. Thus, at time $t_0$ scaled voltage signal $V_{SC}$ is greater than scaled and sampled voltage signal $V_{SH}$. In response to scaled voltage signal $V_{SC}$ being greater than scaled and sampled voltage signal $V_{SH}$, comparator 20 generates a comparison voltage $V_{COMP}$ having a logic high voltage level at output terminal 21.

At time $t_0$, oscillator 56 generates an output or control signal $V_{OSC}$ that transitions from a logic low voltage level ($V_L$) to a logic high voltage level ($V_H$). Control signal $V_{OSC}$ being at a logic high voltage level closes switch 52, thereby sampling the scaled voltage signal appearing at node 18 and generating scaled and sampled voltage signal $V_{SH}$, which appears at the inverting input terminal of comparator 20, charges capacitor 54, and is compared with sampled voltage signal $V_{SC}$ that appears at the noninverting input terminal of comparator 20. Between times $t_0$ and $t_1$, the output signal $V_{OSC}$ transitions to a logic low voltage level, which opens switch 52. In embodiments in which switch 52 is a transistor, closing switch 52 is analogous to turning on the transistor and opening switch 52 is analogous to turning off the transistor. It should be noted that at time $t_0$ comparison signal $V_{COMP}$ remains unchanged because comparator 20 has hysteresis. This allows the voltage across capacitor 54 to stabilize after the control signal $V_{OSC}$ transitions to the logic low voltage level between times $t_0$ and $t_1$. After the voltage across capacitor 54 has stabilized and before time $t_1$, comparator 20 compares voltage $V_{SC}$ at its noninverting input terminal with voltage $V_{SH}$ at its inverting input terminal. Voltage signal $V_{SC}$ is greater than voltage signal $V_{SH}$, thus between times $t_0$ and $t_1$ comparator 20 continues to generate a comparison signal $V_{COMP}$ having a logic high voltage level at output terminal 21. Although control signal $V_{OSC}$ is shown as having a 50 percent duty cycle, this is not a limitation of the present invention. The duty cycle of control signal $V_{OSC}$ may be greater than 50% or less than 50%.

At time $t_1$, control signal $V_{OSC}$ transitions from logic low voltage level $V_L$ to logic high voltage level $V_H$. Control signal $V_{OSC}$ being at a logic high voltage level closes switch 52, thereby sampling the scaled voltage signal appearing at node 18 and generating scaled and sampled voltage signal $V_{SH}$, which appears at the inverting input terminal of comparator 20, charges capacitor 54, and is compared with sampled voltage signal $V_{SC}$ that appears at the noninverting input terminal of comparator 20. It should be noted that between times $t_1$ and $t_2$, output signal $V_{OSC}$ transitions to a logic low voltage level, which opens switch 52. It should be further noted that at time $t_1$ comparison signal $V_{COMP}$ remains unchanged because comparator 20 has hysteresis. This allows the voltage across capacitor 54 to stabilize after control signal $V_{OSC}$ transitions to the logic low voltage level between times $t_1$ and $t_2$. After the voltage across capacitor 54 has stabilized and before time $t_2$, comparator 20 compares voltage $V_{SC}$ at its noninverting input terminal with signal $V_{SH}$ that appears at its inverting input terminal. Voltage signal $V_{SC}$ is greater than voltage signal $V_{SH}$, thus between times $t_1$ and $t_2$ comparator 20 continues to generate a comparison signal $V_{COMP}$ having a logic high voltage level at output terminal 21.

At time $t_2$, control signal $V_{OSC}$ transitions from logic low voltage level $V_L$ to logic high voltage level $V_H$. Control signal $V_{OSC}$ being at a logic high voltage level closes switch 52, thereby sampling the scaled voltage appearing at node 18 and generating scaled and sampled voltage signal $V_{SH}$, which appears at the inverting input terminal of comparator 20, charges capacitor 54, and is compared with sampled voltage signal $V_{SC}$ that appears at the noninverting input terminal of comparator 20. It should be noted that between times $t_2$ and $t_3$, output signal $V_{OSC}$ transitions to a logic low voltage level, which opens switch 52. It should be further noted that at time $t_2$ comparison signal $V_{COMP}$ remains unchanged because comparator 20 has hysteresis. This allows the voltage across capacitor 54 to stabilize after the control signal $V_{OSC}$ transitions to the logic low voltage level between times $t_2$ and $t_3$. After the voltage across capacitor 54 has stabilized and before time $t_3$, comparator 20 compares voltage $V_{SC}$ at its noninverting input terminal with voltage $V_{SH}$ at its inverting input terminal. Voltage signal $V_{SC}$ is greater than voltage signal $V_{SH}$, thus between times $t_2$ and $t_3$ comparator 20 continues to generate a comparison signal $V_{COMP}$ having a logic high voltage level at output terminal 21.

From time $t_3$ to time $t_8$, controller 50 continues generating scaled voltage signal $V_{SC}$ at node 18, sampling and holding the voltage at node 18 to generate scaled and sampled voltage signal $V_{SH}$, comparing signal $V_{SH}$ with the current value of scaled voltage signal $V_{SC}$ at the noninverting input terminal of comparator 20, and generating comparison voltage $V_{COMP}$ having a logic high level output terminal 21 in response to voltage signal $V_{SC}$ being greater than voltage signal $V_{SH}$.

Between times $t_8$ and $t_9$, scaled voltage signal $V_{SC}$ at node 18 transitions from a rising or increasing voltage signal to a falling or decreasing voltage signal, i.e., scaled voltage signal $V_{SC}$ passes through the positive peak of the periodic signal. At time $t_9$, control signal $V_{OSC}$ from oscillator 56 transitions from logic low voltage level $V_L$ to logic high voltage level $V_H$, which closes switch 52, thereby sampling the scaled voltage appearing at node 18 and generating scaled and sampled voltage $V_{SH}$. Scaled and sampled voltage $V_{SH}$ appears at the inverting input terminal of comparator 20, partially discharges capacitor 54, and is compared with a sampled voltage signal that appears at the noninverting input terminal of comparator 20. It should be noted that between times $t_8$ and $t_9$, control signal $V_{OSC}$ of oscillator 56 transitions to a logic low voltage level, which opens switch 52. It should be further noted that at time $t_9$ comparison signal $V_{COMP}$ remains unchanged because comparator 20 has hysteresis. This allows the voltage across capacitor 54 to stabilize after control signal $V_{OSC}$ transitions to the logic low voltage level between times $t_8$ and $t_9$. After the voltage across capacitor 54 has stabilized and before time $t_9$, comparator 20 compares scaled voltage $V_{SC}$ at its noninverting input terminal with scaled and sampled voltage $V_{SH}$ at its inverting input terminal. Scaled voltage $V_{SC}$ is less than scaled and sampled voltage $V_{SH}$, thus comparison voltage $V_{COMP}$ at output terminal 21 of comparator 20 is at a logic low voltage level.

In response to comparison voltage $V_{COMP}$ changing from a logic high voltage level to a logic low voltage level, falling edge detector 60 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

At time $t_{10}$, control signal $V_{OSC}$ transitions from logic low voltage level $V_L$ to logic high voltage level $V_H$. Control signal $V_{OSC}$ being at a logic high voltage level closes switch 52, thereby sampling the scaled voltage appearing at node 18 and generating scaled and sampled voltage signal $V_{SH}$, which appears at the inverting input terminal of comparator 20, partially discharges capacitor 54, and is compared with sampled voltage signal $V_{SC}$ that appears at the noninverting input terminal of comparator 20. It should be noted that between times $t_9$ and $t_{10}$, output signal $V_{OSC}$ transitions to a logic low voltage level, which opens switch 52. It should be further noted that at time $t_0$ comparison signal $V_{COMP}$ remains unchanged because comparator 20 has hysteresis. This allows the voltage across capacitor 54 to stabilize after control signal $V_{OSC}$ transitions to the logic low voltage level between times $t_9$ and $t_{10}$. After the voltage across capacitor 54 has stabilized and before time $t_{10}$, comparator 20 compares voltage $V_{SC}$ at its noninverting input terminal with voltage $V_{SH}$ at its inverting input terminal. Between times $t_9$ and $t_{10}$, voltage signal $V_{SC}$ is less than voltage signal $V_{SH}$, thus comparator 20 continues to generate a comparison signal $V_{COMP}$ having a logic low voltage level at output terminal 21.

At time $t_{11}$, control signal $V_{OSC}$ transitions from logic low voltage level $V_L$ to logic high voltage level $V_H$. Control signal $V_{OSC}$ being at a logic high voltage level closes switch 52, thereby sampling the scaled voltage appearing at node 18 and generating scaled and sampled voltage signal $V_{SH}$, which appears at the inverting input terminal of comparator 20, partially discharges capacitor 54, and is compared with sampled voltage signal $V_{SC}$ that appears at the noninverting input terminal of comparator 20. It should be noted that between times $t_{10}$ and $t_{11}$, output signal $V_{OSC}$ transitions to a logic low voltage level, which opens switch 52. It should be further noted that at time $t_{11}$ comparison signal $V_{COMP}$ remains unchanged because comparator 20 has hysteresis.

This allows the voltage across capacitor 54 to stabilize after the control signal $V_{OSC}$ transitions to the logic low voltage level between times $t_{10}$ and $t_{11}$. After the voltage across capacitor 54 has stabilized and before time $t_{11}$, comparator 20 compares voltage $V_{SC}$ at its noninverting input terminal with voltage $V_{SH}$ at its inverting input terminal. Between times $t_{10}$ and $t_{11}$, voltage signal $V_{SC}$ is less than voltage signal $V_{SH}$, thus comparator 20 continues to generate a comparison signal $V_{COMP}$ having a logic low voltage level at output terminal 21.

From time $t_{12}$ to time $t_{16}$, controller 50 continues generating scaled voltage signal $V_{SC}$ at node 18, sampling and holding the voltage signal at node 18 to generate scaled and sampled voltage signal $V_{SH}$ at the inverting input terminal of comparator 20, comparing voltage signal $V_{SH}$ with the current value of scaled voltage signal $V_{SC}$ at the noninverting input terminal of comparator 20, and generating comparison voltage $V_{COMP}$ having a logic low level output terminal 21 in response to voltage signal $V_{SC}$ being less than voltage signal $V_{SH}$.

Between times $t_{16}$ and $t_{17}$, scaled voltage signal $V_{SC}$ at node 18 transitions from a falling or decreasing voltage signal to a rising or increasing voltage signal, i.e., scaled voltage signal $V_{SC}$ passes through the negative peak of the periodic signal. At time $t_{17}$, control signal $V_{OSC}$ from oscillator 56 transitions from logic low voltage level $V_L$ to logic high voltage level $V_H$, which closes switch 52, thereby sampling the scaled voltage signal appearing at node 18 and generating scaled and sampled voltage signal $V_{SH}$. Scaled and sampled voltage signal $V_{SH}$ appears at the inverting input terminal of comparator 20, discharges capacitor 54, and is compared with a sampled voltage signal that appears at the noninverting input terminal of comparator 20. It should be noted that between times $t_{16}$ and $t_{17}$, control signal $V_{OSC}$ of oscillator 56 transitions to a logic low voltage level, which opens switch 52. It should be further noted that at time $t_{17}$ comparison signal $V_{COMP}$ remains unchanged because comparator 20 has hysteresis. This allows the voltage across capacitor 54 to stabilize after control signal $V_{OSC}$ transitions to the logic low voltage level between times $t_{16}$ and $t_{17}$. After the voltage across capacitor 54 has stabilized and before time $t_{17}$, comparator 20 compares scaled voltage $V_{SC}$ at its noninverting input terminal with scaled and sampled voltage $V_{SH}$ at its inverting input terminal. Scaled voltage $V_{SC}$ is greater than scaled and sampled voltage $V_{SH}$, thus comparison voltage $V_{COMP}$ at output terminal 21 of comparator 20 is at a logic high voltage level at time $t_{17}$.

In response to comparison voltage $V_{COMP}$ changing from a logic low voltage level to a logic high voltage level, rising edge detector 62 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

From time $t_{17}$ to time $t_{24}$, controller 50 continues generating scaled voltage signal $V_{SC}$ at node 18, sampling and holding the voltage signal at node 18 to generate scaled and sampled voltage signal $V_{SH}$, comparing signal $V_{SH}$ with the current value of scaled voltage signal $V_{SC}$ at the noninverting input terminal of comparator 20, and generating comparison voltage $V_{COMP}$ having a logic high level output terminal 21 in response to voltage signal $V_{SC}$ being greater than signal $V_{SH}$.

Between times $t_{24}$ and $t_{25}$, scaled voltage signal $V_{SC}$ at node 18 transitions from a rising or increasing voltage signal to a falling or decreasing voltage signal, i.e., scaled voltage signal $V_{SC}$ passes through the positive peak of the periodic signal. At time $t_{25}$, control signal $V_{OSC}$ from oscillator 56 transitions from logic low voltage level $V_L$ to logic high voltage level $V_H$, which closes switch 52, thereby sampling the scaled voltage signal appearing at node 18 and generating scaled and sampled voltage signal $V_{SH}$. Scaled and sampled voltage signal $V_{SH}$ appears at the inverting input terminal of comparator 20, partially discharges capacitor 54, and is compared with a sampled voltage signal that appears at the noninverting input terminal of comparator 20. It should be noted that between times $t_{24}$ and $t_{25}$, control signal $V_{OSC}$ of oscillator 56 transitions to a logic low voltage level, which opens switch 52. It should be further noted that at time $t_{25}$ comparison signal $V_{COMP}$ remains unchanged because comparator 20 has hysteresis. This allows the voltage across capacitor 54 to stabilize after control signal $V_{OSC}$ transitions to the logic low voltage level between times $t_{24}$ and $t_{25}$. After the voltage across capacitor 54 has stabilized and before time $t_{25}$, comparator 20 compares scaled voltage signal $V_{SC}$ at its noninverting input terminal with scaled and sampled voltage signal $V_{SH}$ at its inverting input terminal. Scaled voltage signal $V_{SC}$ is less than scaled and sampled voltage signal $V_{SH}$, thus comparison voltage $V_{COMP}$ at output terminal 21 of comparator 20 is at a logic low voltage level.

In response to comparison voltage $V_{COMP}$ changing from a logic high voltage level to a logic low voltage level, falling edge detector 60 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

Between times $t_{25}$ and $t_{26}$, scaled voltage signal $V_{SC}$ at node 18 transitions from a rising or increasing voltage signal to a falling or decreasing voltage signal, i.e., scaled voltage signal $V_{SC}$ passes through the positive peak of the periodic signal. At time $t_{26}$, control signal $V_{OSC}$ from oscillator 56 transitions from logic low voltage level $V_L$ to logic high voltage level $V_H$, which closes switch 52, thereby sampling the scaled voltage appearing at node 18 and generating scaled and sampled voltage signal $V_{SH}$. Scaled and sampled voltage signal $V_{SH}$ appears at the inverting input terminal of comparator 20, partially discharges capacitor 54, and is compared with a sampled voltage signal that appears at the noninverting input terminal of comparator 20. It should be noted that between times $t_{25}$ and $t_{26}$, control signal $V_{OSC}$ of oscillator 56 transitions to a logic low voltage level, which turns off transistor 52. It should be further noted that at time $t_{26}$ comparison signal $V_{COMP}$ remains unchanged because comparator 20 has hysteresis. This allows the voltage across capacitor 54 to stabilize after control signal $V_{OSC}$ transitions to the logic low voltage level between times $t_{25}$ and $t_{26}$. After the voltage across capacitor 54 has stabilized and before time $t_{26}$, comparator 20 compares scaled voltage signal $V_{SC}$ at its noninverting input terminal with scaled and sampled voltage signal $V_{SH}$ at its inverting input terminal. Scaled voltage signal $V_{SC}$ is less than scaled and sampled voltage signal $V_{SH}$, thus comparison voltage $V_{COMP}$ at output terminal 21 of comparator 20 is at a logic low voltage level.

At time $t_{27}$, control signal $V_{OSC}$ transitions from logic low voltage level $V_L$ to logic high voltage level $V_H$. Control signal $V_{OSC}$ being at a logic high voltage level closes switch 52, thereby sampling the scaled voltage signal appearing at node 18 and generating scaled and sampled voltage signal $V_{SH}$, which appears at the inverting input terminal of comparator 20, partially discharges capacitor 54, and is compared with sampled voltage signal $V_{SC}$ that appears at the noninverting input terminal of comparator 20. It should be noted that between times $t_{26}$ and $t_{27}$, output signal $V_{OSC}$ transitions to a logic low voltage level, which opens switch 52. It should be further noted that at time $t_{27}$ comparison signal $V_{COMP}$ remains unchanged because comparator 20 has hysteresis. This allows the voltage across capacitor 54 to stabilize after control signal $V_{OSC}$ transitions to the logic low voltage level between times $t_{26}$ and $t_{27}$. After the voltage across capacitor 54 has stabilized and before time $t_{27}$, comparator 20 compares voltage signal $V_{SC}$ at its noninverting input terminal with voltage signal $V_{SH}$ at its inverting input terminal. Voltage signal $V_{SC}$ is less than voltage signal $V_{SH}$, and comparator 20 continues to generate a comparison signal $V_{COMP}$ having a logic low voltage level at output terminal 21.

From time $t_{26}$ to time $t_{33}$, controller 50 continues generating scaled voltage signal $V_{SC}$ at node 18, sampling and holding the voltage signal at node 18 to generate scaled and sampled voltage signal $V_{SH}$ at the inverting input terminal of comparator 20, comparing voltage signal $V_{SH}$ with the current value of scaled voltage $V_{SC}$ at the noninverting input terminal of comparator 20, and generating comparison voltage $V_{COMP}$ having a logic low level output terminal 21 in response to scaled voltage signal $V_{SC}$ being less than scaled and sampled voltage signal $V_{SH}$.

Between times $t_{33}$ and $t_{34}$, scaled voltage signal $V_{SC}$ at node 18 transitions from a falling or decreasing voltage signal to a rising or increasing voltage signal, i.e., scaled voltage signal $V_{SC}$ passes through the negative peak of the periodic signal. At time 34, control signal $V_{OSC}$ from oscillator 56 transitions from logic low voltage level $V_L$ to logic high voltage level $V_H$, which closes switch 52, thereby sampling the scaled voltage signal appearing at node 18 and generating scaled and sampled voltage signal $V_{SH}$. Scaled and sampled voltage signal $V_{SH}$ appears at the inverting input terminal of comparator 20, charges capacitor 54, and is compared with a sampled voltage signal that appears at the noninverting input terminal of comparator 20. It should be noted that between times $t_{33}$ and $t_{34}$, control signal $V_{OSC}$ of oscillator 56 transitions to a logic low voltage level, which opens switch 52. It should be further noted that at time $t_{34}$ comparison signal $V_{COMP}$ remains unchanged because comparator 20 has hysteresis. This allows the voltage across capacitor 54 to stabilize after control signal $V_{OSC}$ transitions to the logic low voltage level between times $t_{33}$ and $t_{34}$. After the voltage across capacitor 54 has stabilized and before time $t_{34}$, comparator 20 compares scaled voltage signal $V_{SC}$ at its noninverting input terminal with scaled and sampled voltage signal $V_{SH}$ at its inverting input terminal. Scaled voltage signal $V_{SC}$ is greater than scaled and sampled voltage signal $V_{SH}$, thus comparison voltage $V_{COMP}$ at output terminal 21 of comparator 20 is at a logic high voltage level.

From time $t_{35}$ to time $t_{39}$, controller 50 continues generating scaled voltage signal $V_{SC}$ at node 18, sampling and holding the voltage signal at node 18 to generate scaled and sampled voltage signal $V_{SH}$, comparing voltage signal $V_{SH}$ with the current value of scaled voltage signal $V_{SC}$ at the noninverting input terminal of comparator 20, and generating comparison voltage $V_{COMP}$ having a logic high level output terminal 21 in response to scaled voltage signal $V_{SC}$ being greater than scaled and sampled voltage signal $V_{SH}$.

Comparator 20 has built-in symmetric hysteresis, which provides noise immunity. The hysteresis also serves to define the resolution between the slopes of the AC signal and the DC signal. If the output signal of comparator 20 is at a logic high voltage level, the slope of the signal at the noninverting input terminal is higher than the set resolution level and the slope is positive. If the output signal of comparator 20 is at a low logic level, then the slope of the signal at the noninverting input terminal is lower than the set resolution level or the slope is negative. Detection timer 26 may be reset by any edge of the comparator output signal. The absence of an edge of the comparator output signal before the timer elapses indicates the presence of a DC signal or a signal with a small AC ripple at input terminal 12. In response to a DC signal at input terminal 12, comparator 20 generates a logic low voltage level at its output terminal and detection timer is not reset.

Figure 4:
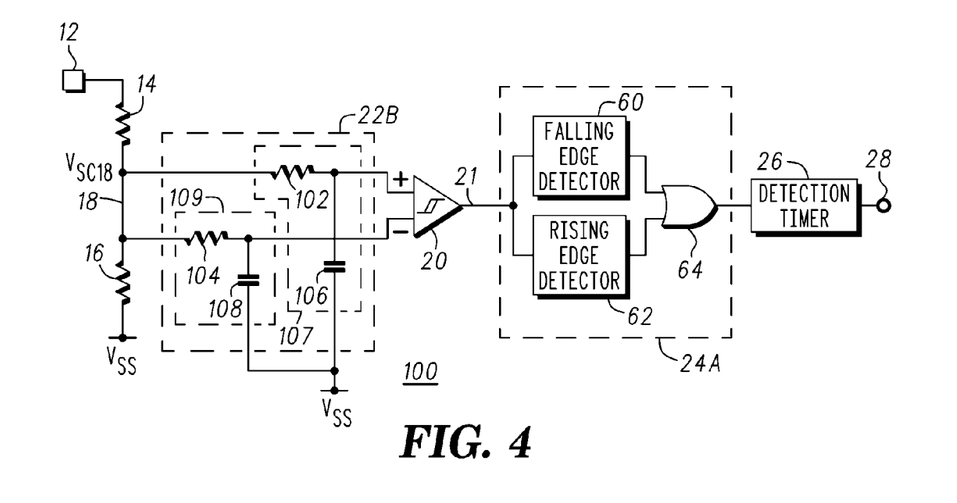
FIG. 4 is a circuit schematic of a portion of a controller in accordance with another embodiment of the present invention.

FIG. 4 is a circuit schematic of a controller 100 in accordance with another embodiment of the present invention. Like controller 50, controller 100 includes resistors 14 and 16, reset signal generator 24A, comparator 20, timer 26, and a delay circuit. Because the delay circuit may have a different architecture or configuration from delay circuits 22 and 22A, it is identified by reference character 22B. Delay circuit 22B may be comprised of delay circuit elements or structures 107 and 109. By way of example, delay circuit elements 107 and 109 are RC filters. Delay circuit element 107 may be comprised of a resistor 102 connected between node 18 and the noninverting input terminal of comparator 20 and a capacitor 106 coupled between the noninverting input terminal of comparator 20 and source of operating potential $V_{SS}$. RC filter 107 has a time constant substantially equal to the product of the resistance value of resistor 102 and the capacitance value of capacitor 106. Delay circuit element 109 may be comprised of a resistor 104 connected between node 18 and the inverting input terminal of comparator 20 and a capacitor 108 coupled between the inverting input terminal of comparator 20 and source of operating potential $V_{SS}$. RC filter 109 has a time constant substantially equal to the product of the resistance value of resistor 104 and the capacitance value of capacitor 108. Energy storage elements 106 and 108 may be a circuit element capable of storing an analog voltage, an analog current, or charge. By way of example, energy storage elements 106 and 108 are capacitors.

Figure 5:
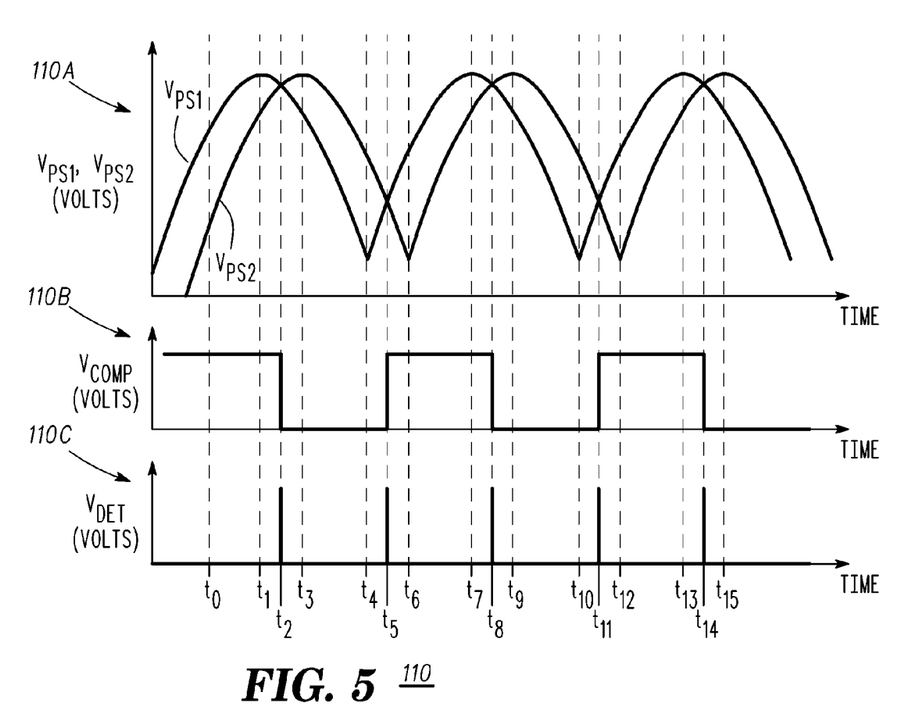
FIG. 5 is a timing diagram for the portion of the controller of FIG. 4 in accordance with an embodiment of the present invention.

In operation, controller 100 detects the occurrence of a rising edge or a falling edge of an AC signal appearing at input terminal 12 and transmits a scaled representation of the AC signal to the noninverting input terminal of comparator 20. In response to the rising edge or the falling edge, controller 100 determines whether an AC signal is coupled to input terminal 12. FIG. 5 is a timing diagram 110 that illustrates the operation of controller 100 in accordance with an embodiment of the present invention. Timing diagram 110 includes voltage plots 110A, 110B, and 110C. Plot 110A includes a graph of phase shifted signals $V_{PS1}$ and $V_{PS2}$ that appear at the noninverting and inverting input terminals of comparator 20, respectively, versus time. Signals $V_{PS1}$ and $V_{PS2}$ are phase shifted representations of scaled signal $V_{SC18}$ appearing at node 18. Plot 110B is a graph an output voltage $V_{COMP}$ of comparator 20 versus time and plot 110C is a graph of an output signal $V_{DET}$ of detection timer 26 versus time. Output signal $V_{DET}$ may be referred to as a detection signal.

Still referring to FIG. 5, before time $t_0$ an AC voltage signal $V_{SC}$ appears at node 18 that is a scaled representation of the AC signal appearing at input terminal 12. Scaled voltage signal $V_{SC18}$ at node 18 is input into RC filter 107, which generates a phase shifted or delayed AC signal $V_{PS1}$ at the noninverting input terminal of comparator 20. Scaled voltage signal $V_{SC18}$ at node 18 is input into RC filter 109, which generates a phase shifted or delayed AC signal $V_{PS2}$ at the inverting input terminal of comparator 20. In accordance with an embodiment, the time constant of RC filter 107 is less than the time constant of RC filter 109, thus there is a phase delay between signals $V_{PS1}$ and $V_{PS2}$. It should be noted that the values of the time constants of RC filters 107 and 109 are not limitations of the present invention. For example, the time constants may be equal, the time constant of RC filter 107 may be greater than that of RC filter 109, etc.

From time $t_0$ to time $t_1$ AC signal $V_{PS1}$ rises or increases and from time $t_0$ to time $t_3$ AC signal $V_{PS2}$ rises or increases. At time $t_1$ AC signal $V_{PS1}$ begins to fall or decrease and at time $t_2$ AC signal $V_{PS1}$ is substantially equal to AC signal $V_{PS2}$. Thus, from time $t_0$ to time $t_2$, AC signal $V_{PS1}$ is greater than AC signal $V_{PS2}$. In response to AC signal $V_{PS1}$ being greater than AC signal $V_{PS2}$ from time $t_0$ to about time $t_2$, comparator 20 generates a comparison signal $V_{COMP}$ having a logic high voltage level at output terminal 21. In response to AC signal $V_{PS1}$ becoming less than AC signal $V_{PS2}$ at about time $t_2$ comparison signal $V_{COMP}$ transitions to a logic low voltage level, falling edge detector 60 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

From about time $t_2$ to about time $t_5$, AC voltage signal $V_{PS1}$ is less than AC voltage signal $V_{PS2}$. Thus, comparator 20 continues to generate comparison signal $V_{COMP}$ having a logic low voltage level at output terminal 21. At about time $t_4$, AC voltage signal $V_{PS1}$ begins to rise or increase and at time $t_5$ AC signal $V_{PS1}$ is substantially equal to AC signal $V_{PS2}$. Thus, from time $t_2$ to time $t_5$, AC signal $V_{PS1}$ is less than AC signal $V_{PS2}$. In response to AC signal $V_{PS1}$ being less than AC signal $V_{PS2}$ from time $t_2$ to about time $t_5$, comparison signal $V_{COMP}$ generated by comparator 20 is at a logic low voltage level. In response to AC signal $V_{PS1}$ becoming greater than AC signal $V_{PS2}$ at about time $t_5$ comparison signal $V_{COMP}$ generated by comparator 20 transitions to a logic high voltage level, rising edge detector 62 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

From about time $t_5$ to about time $t_8$, AC voltage signal $V_{PS1}$ is greater than AC voltage signal $V_{PS2}$. Thus, comparison signal $V_{COMP}$ remains a logic high voltage level. At about time $t_7$, AC voltage signal $V_{PS1}$ begins to fall or decrease and at time $t_8$ AC signal $V_{PS1}$ is substantially equal to AC signal $V_{PS2}$. Thus, from time $t_5$ to time $t_8$, AC signal $V_{PS1}$ is greater than AC signal $V_{PS2}$. In response to AC signal $V_{PS1}$ becoming greater than AC signal $V_{PS2}$ at about time $t_8$, comparison signal $V_{COMP}$ transitions to a logic low voltage level, falling edge detector 60 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

From about time $t_8$ to about time $t_{11}$, AC voltage signal $V_{PS2}$ is greater than AC voltage signal $V_{PS1}$. Thus, comparison signal $V_{COMP}$ and detection signal $V_{DET}$ remain at logic low voltage levels. At about time $t_{10}$, AC voltage signal $V_{PS1}$ begins to rise or increase and at time $t_{11}$ AC signal $V_{PS1}$ is substantially equal to AC signal $V_{PS2}$. Thus, from time $t_8$ to time $t_{11}$, AC signal $V_{PS1}$ is less than AC signal $V_{PS2}$. In response to AC signal $V_{PS1}$ being less than AC signal $V_{PS2}$ from time $t_8$ to about time $t_{11}$, comparison signal $V_{COMP}$ generated by comparator 20 remains at a logic low voltage level. In response to AC signal $V_{PS1}$ becoming greater than AC signal $V_{PS2}$ at about time $t_{11}$, comparison signal $V_{COMP}$ transitions to a logic high voltage level, rising edge detector 62 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

From about time $t_{11}$ to about time $t_{14}$, AC voltage signal $V_{PS1}$ is greater than AC voltage signal $V_{PS2}$. Thus, comparison signal $V_{COMP}$ remains a logic high voltage level and detection signal $V_{DET}$ remains at a logic low voltage. At about time $t_{13}$, AC voltage signal $V_{PS1}$ begins to fall or decrease and at time $t_{14}$ AC signal $V_{PS1}$ is substantially equal to AC signal $V_{PS2}$. Thus, from time $t_{11}$ to time $t_{14}$, AC signal $V_{PS1}$ is greater than AC signal $V_{PS2}$. In response to AC signal $V_{PS1}$ being greater than AC signal $V_{PS2}$ from time $t_{11}$ to about time $t_{14}$, comparison signal $V_{COMP}$ generated by comparator 20 is at a logic high voltage level. In response to AC signal $V_{PS1}$ becoming greater than AC signal $V_{PS2}$ at about time $t_{14}$ comparison signal $V_{COMP}$ transitions to a logic low voltage level, falling edge detector 60 generates a positive pulse, which propagates through logic gate 64 to the reset terminal of detection timer 26. In the absence of a reset signal at the reset terminal, timer 26 times out and generates an indicator signal at output terminal 28 indicating that the power supply is no longer coupled to an AC signal source. This signal may be used to enable the discharge of X2 capacitors. By way of example, the indicator signal may be a logic high voltage level appearing at output terminal 28.

Figure 6:
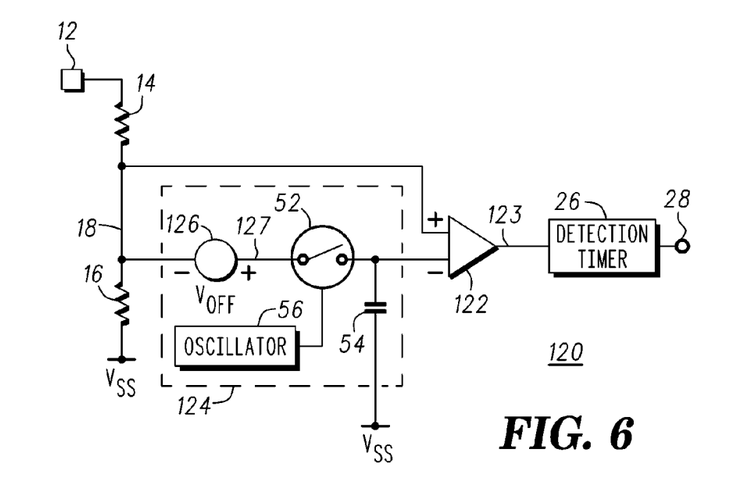
FIG. 6 is a circuit schematic of a portion of a controller in accordance with another embodiment of the present invention.

FIG. 6 is a circuit schematic of a controller 120 in accordance with another embodiment of the present invention. Like controller 50, controller 120 includes resistors 14 and 16, timer 26, a comparator, and a delay circuit. Because the comparator and the delay circuit may have different architectures or configurations from comparator 20 and delay circuit 22A, they are identified by reference characters 122 and 124, respectively. Comparator 122 has an output terminal 123 but does not have hysteresis, and delay circuit 124 may be comprised of switch 52 and a voltage source 126 connected between node 18 and the inverting input terminal of comparator 122, energy storage element 54 connected between the inverting input terminal of comparator 122 and source of operating potential $V_{SS}$, and oscillator 56 having an output terminal connected to the gate or control electrode of switch 52. It should be noted that detection of a positive or negative slope of the AC signal appearing at input terminal 12 is influenced by the polarity of voltage source 126. In response to the negative terminal or node of voltage source 126 being connected to node 18, controller 120 detects the positive slope of the AC signal appearing at input terminal 12 and in response to the positive terminal or node of voltage source 126 being connected to node 18 controller 120 detects the negative slope of the AC signal appearing at input terminal 12. Switch 52, energy storage element 54, and oscillator 56 have been described with reference to FIG. 2.

Detection timer 26 has an input terminal connected to output terminal 123 of comparator 122 and an output terminal 28.

Figure 7:
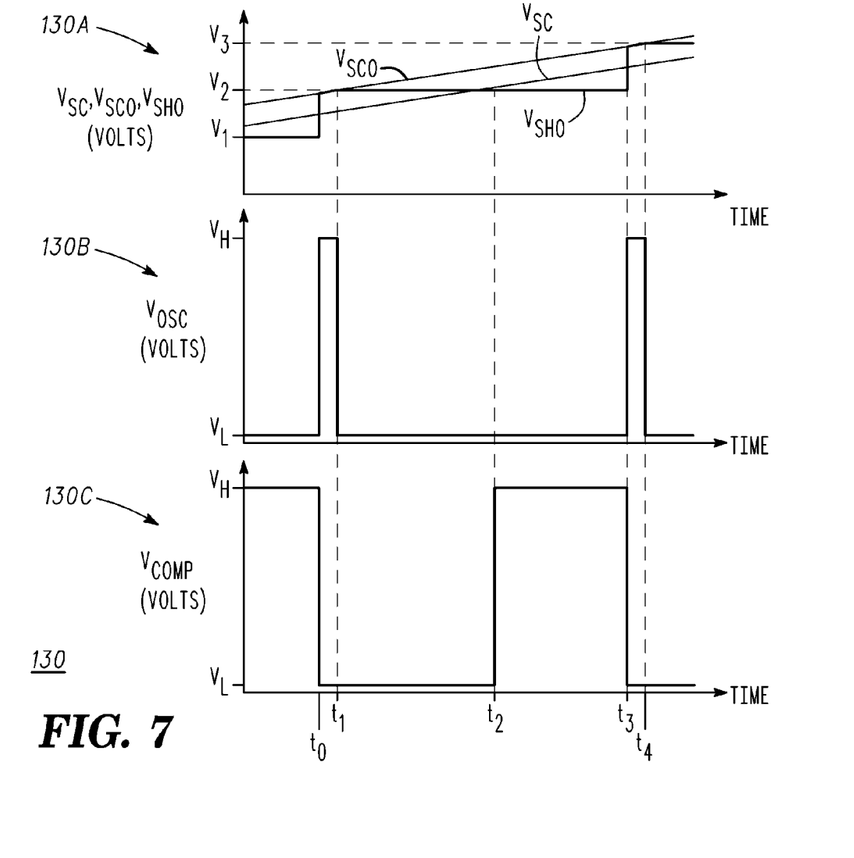
FIG. 7 is a timing diagram for the portion of the controller of FIG. 6 in accordance with another embodiment of the present invention.

In operation, controller 150 detects the occurrence of an edge of an AC signal appearing at input terminal 12 and transmits a scaled representation $V_{SC}$ of the AC signal to the noninverting input terminal of comparator 122. In response to, for example, the rising edge, controller 120 determines whether an AC signal is coupled to input terminal 12. FIG. 7 is a timing diagram 130 that illustrates the operation of controller 120 in accordance with an embodiment of the present invention. Timing diagram 130 includes voltage plots 130A, 130B, and 130C. Plot 130A includes a graph of a signal $V_{SC}$ that is an AC signal appearing at node 18 versus time, a graph of a signal $V_{SCO}$ appearing at node 127, wherein signal $V_{SCO}$ is the scaled representation of the AC signal appearing at node 18 plus an offset voltage $V_{OFF}$ versus time, and a graph of a signal $V_{SHO}$ appearing at the noninverting input terminal of comparator 122 plus an offset voltage versus time, wherein signal $V_{SHO}$ is a sampled signal of signal $V_{SCO}$. It should be noted that voltage $V_{SHO}$ is substantially equal to the voltage across capacitor 54 and source of operating potential $V_{SS}$. In embodiments in which source of operating potential $V_{SS}$ is ground, voltages signal $V_{SHO}$ is substantially equal to the voltage across capacitor 54. It should be noted that signal $V_{SHO}$ is a delayed signal, thus for a point in time, e.g., time $t_1$, the value of signal $V_{SHO}$ at the inverting input terminal is different from the value of signal $V_{SCO}$ at the noninverting input terminal because it was sampled at an earlier time than the current value of signal $V_{SCO}$ appearing at the noninverting input terminal. Plot 130B is a graph of an output signal $V_{OSC}$ from oscillator 56 and plot 130C is a graph an output voltage $V_{COMP}$ at output terminal 123 of comparator 122 versus time. Output signal $V_{OSC}$ may be referred to as a clock signal or a control signal because it serves as a control signal for switch 52.

Still referring to FIG. 7, before time $t_0$ scaled voltage $V_{SC}$ is greater than sampled signal $V_{SHO}$ and less than voltage $V_{SCO}$ at node 127, oscillator output signal $V_{OSC}$ is at a logic low voltage level and output signal $V_{COMP}$ is at a logic high voltage level. Because signals $V_{SC}$ and $V_{SHO}$ appear at the noninverting and inverting input terminals of comparator 122, respectively, signal $V_{SC}$ is greater than signal $V_{SHO}$, and comparison signal $V_{COMP}$ generated by comparator 122 is at a logic low voltage level. A voltage $V_{SCO}$ at node 127 is substantially equal to the sum of scaled voltage signal $V_{SC}$ and an offset voltage $V_{OFF}$ introduced by voltage source 126. At time $t_0$, oscillator 56 generates an output or control signal $V_{OSC}$ that transitions from logic low voltage level $V_L$ to logic high voltage level $V_H$. Control signal $V_{OSC}$ being at a logic high voltage level closes switch 52, thereby sampling voltage signal $V_{SCO}$ appearing at node 127 and generating scaled and sampled voltage signal $V_{SHO}$ that includes offset component $V_{OFF}$. Voltage signal $V_{SHO}$ increases from voltage level $V_1$ to voltage level $V_2$, which is greater than voltage signal $V_{SC}$. Voltage signal $V_{SHO}$ appears at the inverting input terminal of comparator 122, charges capacitor 54, and is compared with sampled voltage signal $V_{SC}$ that appears at the noninverting input terminal of comparator 122. In response to voltage signal $V_{SHO}$ being greater than voltage signal $V_{SC}$, voltage signal $V_{COMP}$ at output terminal 123 transitions to a logic low voltage level.

At time $t_1$, control signal $V_{OSC}$ transitions to a logic low voltage level. From time $t_0$ to time $t_1$, voltage signals $V_{SC}$ and $V_{SCO}$ increase.

At time $t_2$, voltage signal $V_{SC}$ is greater than voltage signal $V_{SHO}$ which causes voltage signal $V_{COMP}$ at output terminal 123 to transition to a logic low voltage level. From time $t_1$ to time $t_2$, voltage signals $V_{SC}$ and $V_{SCO}$ increase.

At time $t_3$, oscillator 56 generates an output or control signal $V_{OSC}$ that transitions from logic low voltage level $V_L$ to logic high voltage level $V_H$. Control signal $V_{OSC}$ being at a logic high voltage level closes switch 52, i.e., turns on transistor 52 in embodiments in which switch 52 comprises a transistor, thereby sampling voltage $V_{SCO}$ appearing at node 127 and generating scaled and sampled voltage signal $V_{SHO}$ that includes offset component $V_{OFF}$. Voltage signal $V_{SHO}$ increases from voltage level $V_2$ to voltage level $V_3$, which is greater than voltage signal $V_{SC}$. Voltage signal $V_{SHO}$ appears at the inverting input terminal of comparator 122, charges capacitor 54, and is compared with sampled voltage signal $V_{SC}$ that appears at the noninverting input terminal of comparator 122. In response to voltage signal $V_{SHO}$ being greater than voltage signal $V_{SC}$, voltage signal $V_{COMP}$ at output terminal 123 transitions to a logic low voltage level.

At time $t_4$, control signal $V_{OSC}$ transitions to a logic low voltage level. From time $t_2$ to time $t_3$, voltage signals $V_{SC}$ and $V_{SCO}$ increase.

Figure 8:
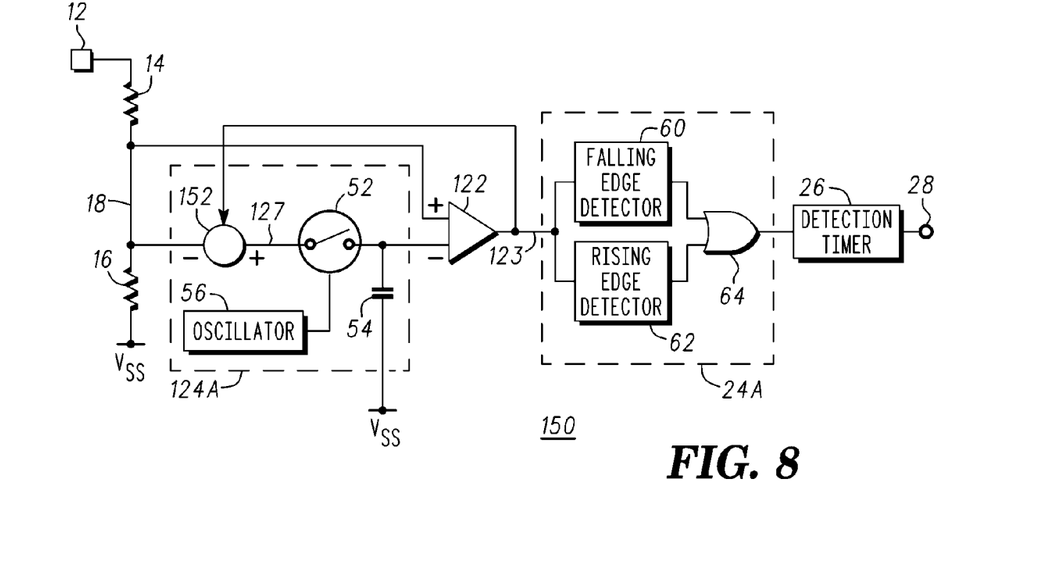
FIG. 8 is a circuit schematic of a portion of a controller in accordance with another embodiment of the present invention.

FIG. 8 is a circuit schematic of a controller 150 in accordance with another embodiment of the present invention. Like controller 120, controller 150 includes resistors 14 and 16, timer 26, comparator 122, and a delay circuit. In addition, controller 120 includes edge detection circuitry 24A. Because the delay circuit may have a different architecture or configuration from delay circuit 124, it is identified by reference character 124A. By way of example, delay circuit 124 may be comprised of switch 52 and a controlled voltage source 152 connected between node 18 and the inverting input terminal of comparator 122, energy storage element 54 connected between the inverting input terminal of comparator 122 and source of operating potential $V_{SS}$, and oscillator 56 having an output terminal connected to the gate or control electrode of transistor 54. Switch 52, energy storage element 54, oscillator 56, reset signal generator 24A, and timer 26 have been described with reference to FIG. 2 and comparator 122 has been described with reference to FIG. 6.

Voltage source 152 is a controlled voltage source having a control terminal connected to output terminal 123 of comparator 122.

Detection timer 26 has an input terminal and an output terminal 28, wherein the input terminal is connected to output terminal 123 of comparator 122 through edge detection circuitry 24A.

The operation of controller 150 may be described as a combination of the description of FIGS. 3 and 7.

By now it should be appreciated that a structure and method for detecting the presence of an AC line signal has been provided. In accordance with various embodiments, the controller includes a detection timer coupled to an output of a comparator through a reset signal generator. The comparator has an input terminal coupled for receiving a scaled signal and an input terminal coupled for receiving a delayed scaled input signal. In the absence of a reset signal at the reset terminal at its input, detection timer 26 times out and generates an indicator signal at output terminal 28 indicating that the power supply is no longer coupled to an AC signal source. This signal may be used to enable the discharge of X2 capacitors.

The controller senses the slope of a high voltage signal in the time domain and compares a direct sample of the AC line signal with a delayed sample of the AC line signal. As discussed above, the controller generates a reset signal in response to the presence of an AC line signal and generates an indicator signal in response to the absence of an AC line signal. The delay may be generated using analog techniques such as, for example, an RC phasing network with different time constants or with a single time constant, or it may be generated using digital techniques such as, for example, sample and hold circuitry.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for operating a power supply, comprising:
   comparing a first signal with a second signal using a comparator, wherein the second signal is derived from the first signal;
   generating a first comparison signal at an output of the comparator in response to the first signal being greater than or less than the second signal, the first comparison signal transitioning to a first level, wherein the first and second signals are independent signals from the comparison signal; and
   using a timer to generate a detection signal in response to the first comparison signal transitioning to the first level, wherein the detection signal indicates that a timer has timed out in response to the power supply being decoupled from an AC signal source.

2. The method of claim 1, wherein comparing the first signal with the second signal includes:
   scaling a first AC signal to generate a scaled signal at a first node; and
   sampling the scaled signal to generate the second signal.

3. The method of claim 2, wherein generating the second signal further comprises storing the sampled signal across a first energy storage element.

4. The method of claim 1, wherein comparing the first signal with the second signal includes:
   scaling a first AC signal to generate a scaled signal at a first node;
   generating the first signal having a first time delay in response to the first AC signal; and
   generating the second signal having a second time delay in response to the first AC signal.

5. The method of claim 4, wherein generating the first signal includes using a first time delay structure and generating the second signal includes using a second time delay structure.

6. The method of claim 4, wherein the first time delay structure has a first time constant and the second time delay structure has a second time constant.

7. The method of claim 1, wherein generating the detection signal further comprises:
   detecting an edge of the first comparison signal; and
   generating a detection signal in response to detecting the edge of the first comparison signal.

8. The method of claim 7, wherein detecting the edge of the first comparison signal includes detecting a rising edge or a falling edge of the first comparison signal.

9. A method for operating a power supply, comprising:
   scaling a first AC signal to generate a scaled signal at a first node;
   sampling the scaled signal to generate a second signal;
   storing the sampled signal across a first energy storage element;
   comparing a first signal with the second signal;
   generating a first comparison signal in response to the first signal being greater than or less than the second signal, the first comparison signal transitioning to a first level;
   generating a detection signal in response to the first comparison signal transitioning to the first level; and further including using an output signal from an oscillator to control a conduction mode of a switch, wherein in a first conduction mode the switch is closed and charges the first energy storage element and in a second conduction mode the switch is open.

10. A power supply, comprising:
    a comparator having first and second input terminals and an output terminal, the output terminal of the comparator decoupled from the first and second input terminals of the comparator;
    a delay circuit having an input terminal and an output terminal, the output terminal of the delay circuit coupled to the first input terminal of the comparator; and
    a timer coupled to the output terminal of the comparator, wherein the timer times out in response to the power supply being decoupled from an AC signal source.

11. The power supply of claim 10, wherein the comparator has hysteresis.

12. The power supply of claim 10, further including a voltage scaling network coupled to the first and second input terminals of the comparator.

13. The power supply of claim 10, further including at least one edge detector coupled between the comparator and the timer.

14. The power supply of claim 13, wherein the at least one edge detector includes a rising edge detector and a falling edge detector.

15. The power supply of claim 13, wherein the delay circuit comprises:
    a first resistor having a terminal coupled to the first input terminal of the comparator;
    a first capacitor having a terminal commonly coupled to the terminal of the first resistor and the first input terminal of the comparator;
    a second resistor having a terminal coupled to the second input terminal of the comparator; and
    a second capacitor having a terminal commonly coupled to the terminal of the second resistor and the second input terminal of the comparator.

16. The power supply of claim 10, wherein the delay circuit comprises:
    a switch having a control electrode and first and second current carrying electrodes, the first current carrying electrode coupled to the first input terminal of the comparator;
    an oscillator having an output terminal coupled to the control electrode of the switch; and
    an energy storage element having a terminal commonly coupled to the first current carrying electrode of the switch and to the first input terminal of the comparator.

17. The power supply of claim 10, wherein the delay circuit comprises:
    a switch having a control electrode and first and second current carrying electrodes, the first current carrying electrode coupled to the first input terminal of the comparator;
    a voltage source having a first terminal coupled to the second current carrying electrode of the switch;

an oscillator having an output terminal coupled to the control electrode of the switch;

an energy storage element having a terminal commonly coupled to the first current carrying electrode of the switch and to the first input terminal of the comparator.

18. The voltage source of claim 17, wherein the voltage source is a controlled voltage source having a control terminal and wherein the output terminal of the comparator is coupled to the control terminal of the controlled voltage source.

19. The voltage source of claim 13, wherein the at least one detector includes:

a rising edge detector having an input and an output; and a falling edge detector having an input and an output; wherein the inputs of the falling edge detector and the rising edge detector are coupled together; and further including an OR gate having a first input coupled to the output of the rising edge detector and a second input coupled to the output of the falling edge detector.

20. The power supply of claim 10, wherein the delay circuit comprises:

a transistor having a control electrode and first and second current carrying electrodes, the first current carrying electrode coupled to the first input terminal of the comparator;

a voltage source having a first terminal coupled to the second current carrying electrode of the transistor;

an oscillator having an output terminal coupled to the control electrode of the transistor;

an energy storage element having a terminal commonly coupled to the first current carrying electrode of the transistor and to the first input terminal of the comparator.

21. The power supply of claim 10, wherein the timer is configured to generate a signal in response to the power supply being disconnected from an AC signal.

* * * * *